Patented July 8, 1924.

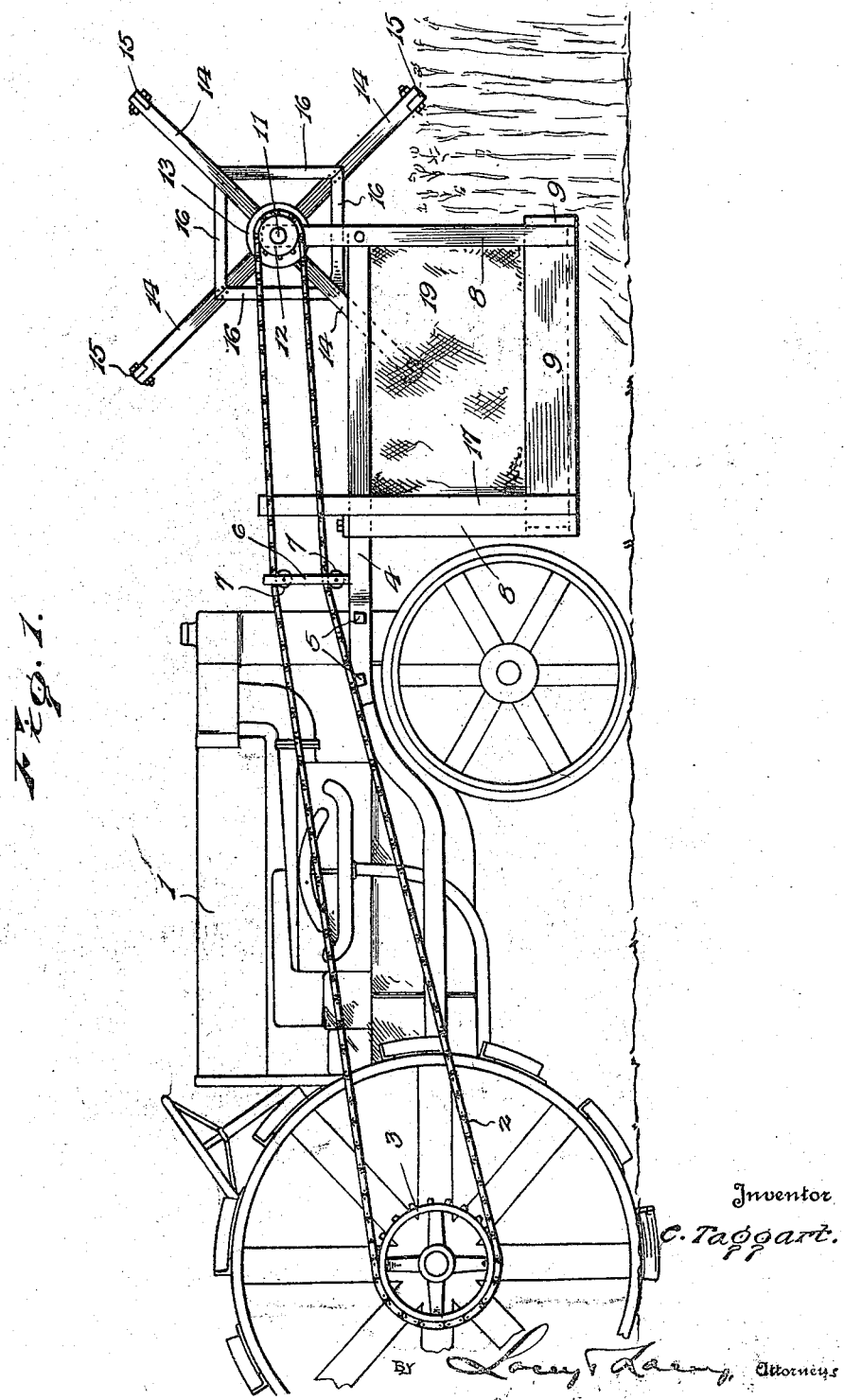

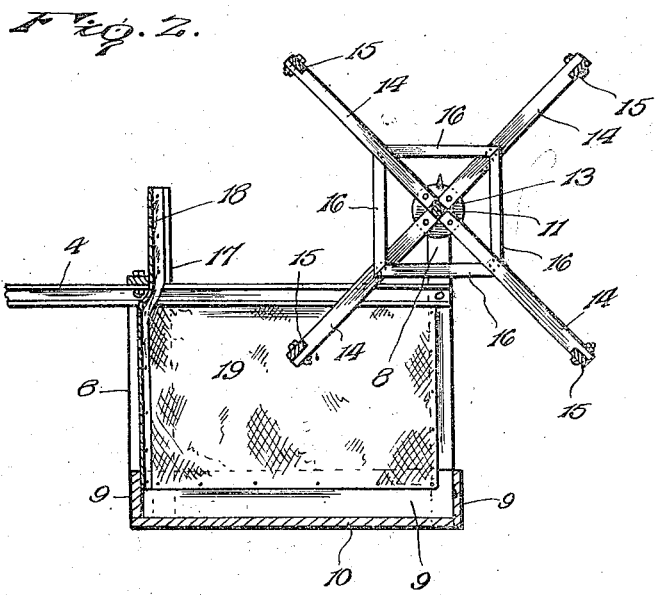
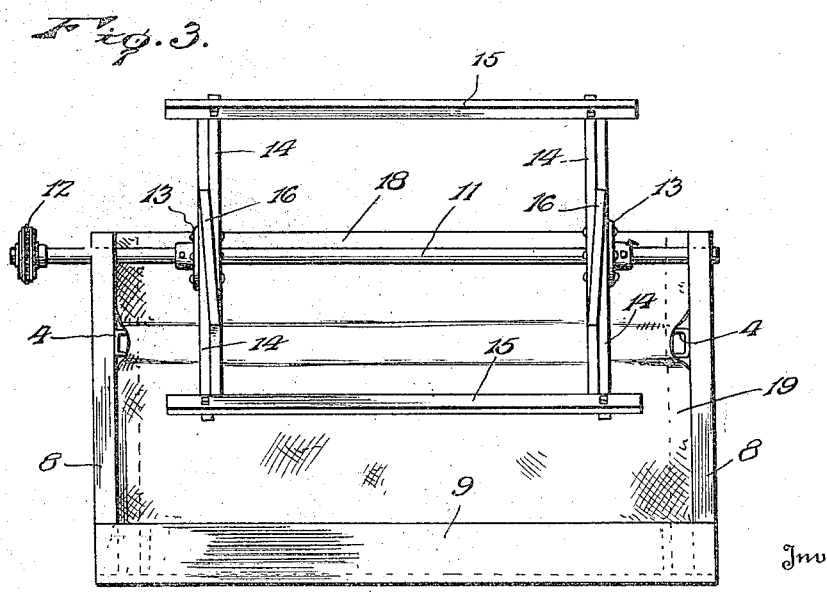

1,500,535

UNITED STATES PATENT OFFICE.

CLAUDE TAGGART, OF MARTINSVILLE, ILLINOIS.

CLOVER HARVESTER.

Application filed October 17, 1922. Serial No. 595,073.

*To all whom it may concern:*

Be it known that I, CLAUDE TAGGART, a citizen of the United States, residing at Martinsville, in the county of Clark and State of Illinois, have invented certain new and useful Improvements in Clover Harvesters, of which the following is a specification.

This invention is an apparatus for harvesting sweet clover, soy beans or similar crops and has for its object the provision of a simple, inexpensive and efficient mechanism which may be mounted at the front of a portable support and actuated as the support is driven over a field to remove from the vines or standing stalks the beans or other products. The invention seeks to provide an apparatus which will gather the crop and carry the same without loss until a large quantity has been harvested, whereupon the harvested crop may be easily removed from the apparatus and stored or transported. The invention is illustrated in the accompanying drawings and will be hereinafter fully set forth.

In the drawings—

Figure 1 is a side elevation of my improved apparatus showing the same mounted upon a tractor and driven therefrom;

Fig. 2 is a longitudinal vertical section of the harvester, and

Fig. 3 is a front elevation of the same.

In the illustrated embodiment of the invention, the harvester is secured to and projects forwardly from the front end of a tractor, which is illustrated conventionally at 1, and is operated by a sprocket chain 2 passing around a sprocket 3 secured to one of the rear driving wheels of the tractor. It is to be understood, however, that the apparatus may be mounted upon any other form of portable support and may be propelled by draft animals in the same manner as any ordinary header is driven. In carrying out the invention, I provide a pair of supporting bars or rails 4 which may be of any desired or preferred form and are preferably channel bars, as shown most clearly in Fig. 3. These rails or supporting bars 4 are shown as secured at their rear ends by bolts 5 to the chassis of the tractor, and upon one of the bars is mounted a bracket 6 having idlers 7 thereon to support and guide the sprocket chain 2. Secured rigidly to the supporting bars 4 and depending therefrom are hangers 8, to the lower ends of which are secured guard rails 9 and a floor 10, the rails serving to maintain the hangers in the proper spaced relation and the floor supporting the harvested crop and also aiding in maintaining the hangers in the proper spaced relation. The front hangers 8 extend above the supporting bars 4, and in their upper extremities is journaled a shaft 11 having one end disposed laterally beyond the adjacent hanger and equipped with a sprocket pinion 12, around which the chain 2 is trained so that motion will be imparted to the said shaft in an obvious manner. Between the hangers 8, hubs 13 are secured to the shaft 11 and to the said hubs I secure radial beater or reel arms 14 which have their outer ends connected in pairs by beater bars 15 disposed transversely of the apparatus, as clearly shown. Braces 16 are secured to the several arms 14 so as to impart additional rigidity to the beater or reel. Immediately adjacent the rear hangers 8, posts or standards 17 are secured to the end rails 9 and rise therefrom above the supporting bars 4 to furnish supports for the back wall 18 of the receptacle. This back wall 18 may be of any desired material and is preferably of canvas or similar material possessing the necessary strength and durability with very little weight so that, while the harvested product will be prevented from flying rearwardly beyond the receptacle, no undue dead weight will be imposed upon the supporting and operating elements. The canvas covering is extended forward from the end edges of the back wall 18 so as to provide end walls 19 which cover the entire area defined by the hangers 8, the end rails 9 and the supporting bars 4, the edges of the walls being secured to the hangers and the rails, as will be readily understood from Fig. 2 of the drawings. The entire front of the receptacle is open except to the extent that the front rail 9 projects above the floor 10 of the receptacle.

The several parts are of such proportions that the floor of the receptacle will be close to the ground and the several beater arms will be in proper position to impinge upon the heads of the plants and bend them over the front rail 9 and beat the seed or heads or other product from the plants into the receptacle. As the apparatus is driven over the field, the rotation of the rear driving wheels will be transmitted to the beater shaft 11 and the beater or reel will be caused to rotate so that the several beater bars 15 will impinge forcibly upon the stalks or other plants and by bending the same sharply over the front rail will loosen and remove the seed, heads or beans. The loosened heads or other crops will, of course, drop upon the floor 10 and will be driven toward the rear of the receptacle by the impact of the beater arms so that the crop will accumulate within the receptacle in an obvious manner. When the apparatus has reached the end of a row or has made one or more trips across the field so that the receptacle is filled, the operation may be momentarily arrested to permit removal of the accumulated crop, after which the operation of harvesting may be resumed. The apparatus is exceedingly simple in the construction and arrangement of its parts so that it is not apt to get out of order and may be operated with a very slight expenditure of power. The simplicity of the device also minimizes the dead weight of the same so that it may be easily secured to and supported by any portable frame or vehicle without imposing any excessive strain upon the same.

Having thus described the invention, what is claimed as new is:

An apparatus for the purpose set forth comprising supporting bars adapted to be secured at their rear ends to a portable support, front and rear hangers secured to and depending from said supporting bars, the front hangers extending above the bars, transverse and longitudinal rails secured to and connecting the lower ends of said hangers, a floor carried by the lower ends of the hangers, posts rising from the supporting bars adjacent the rear hangers, a back wall secured to said posts and the rear hangers and rail, end walls secured to the hangers and the end rails, a shaft mounted in the upper ends of the front hangers, radial beater arms secured to said shaft, beater bars secured to and connecting the ends of the said beater arms and extending parallel with the said shaft, and means for rotating said shaft whereby the beater bars will be caused to travel rearwardly below the shaft through the open space between the front hangers.

In testimony whereof I affix my signature.

CLAUDE TAGGART. [L. S.]